Aug. 21, 1956
G. C. WEAVER ET AL
2,759,691
AIRCRAFT CARGO LOADING DOORS
Filed Aug. 4, 1953
6 Sheets-Sheet 3
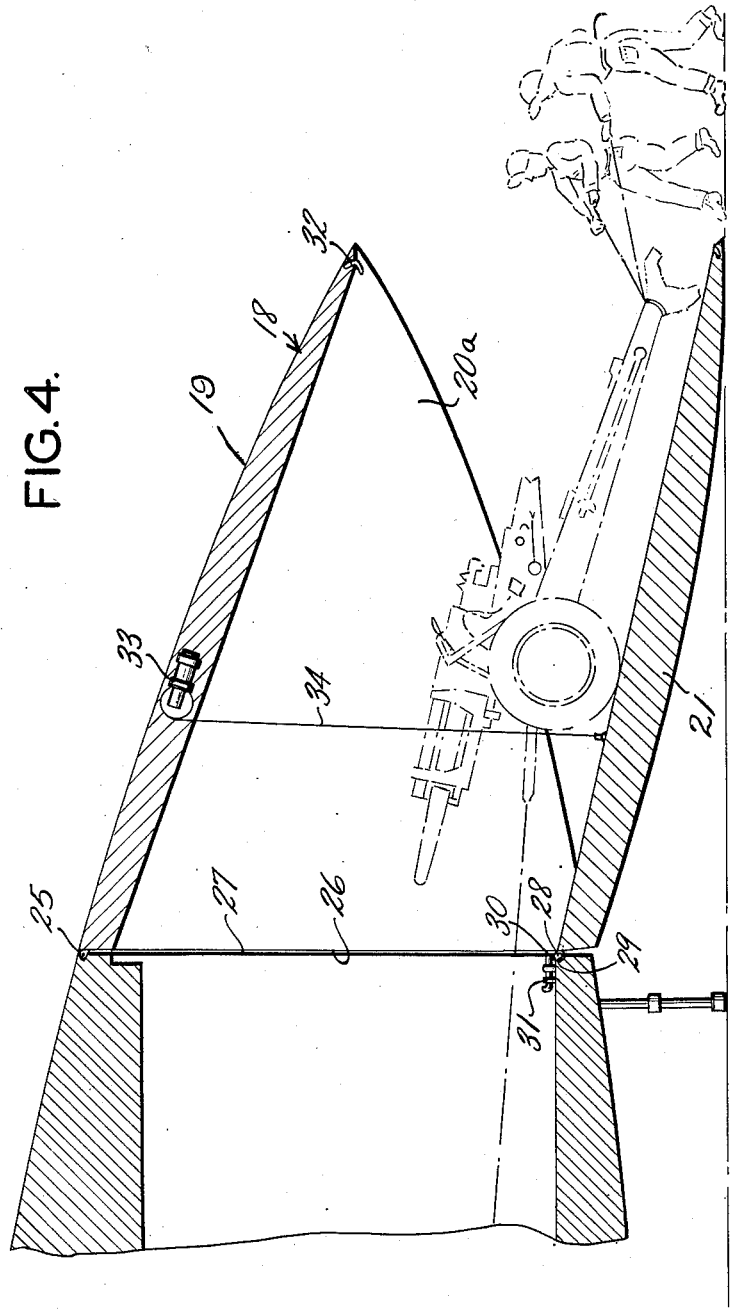
INVENTORS.
GEORGE G. WEAVER &
KENNETH W. McCORMICK
BY
*their* ATTORNEYS.

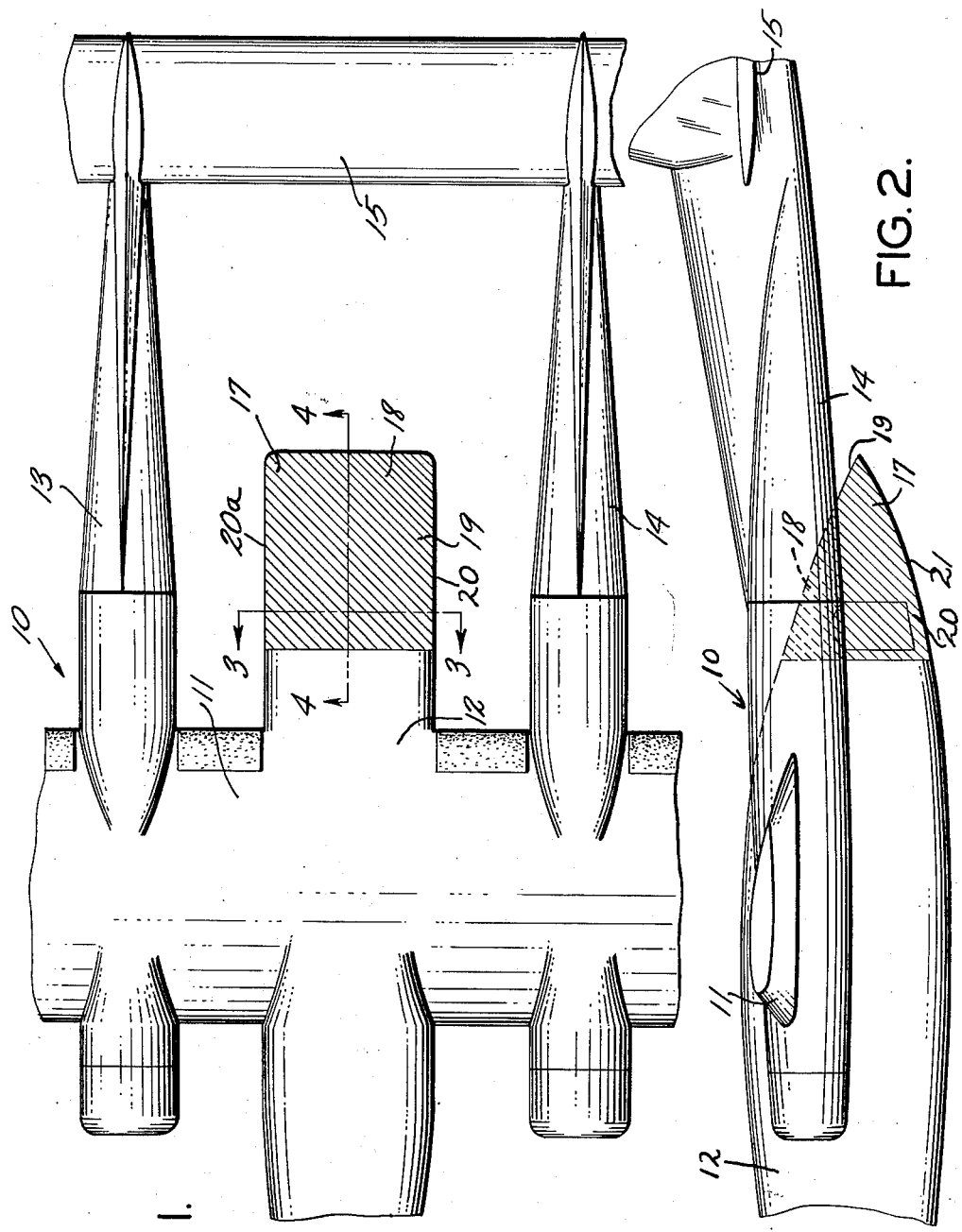

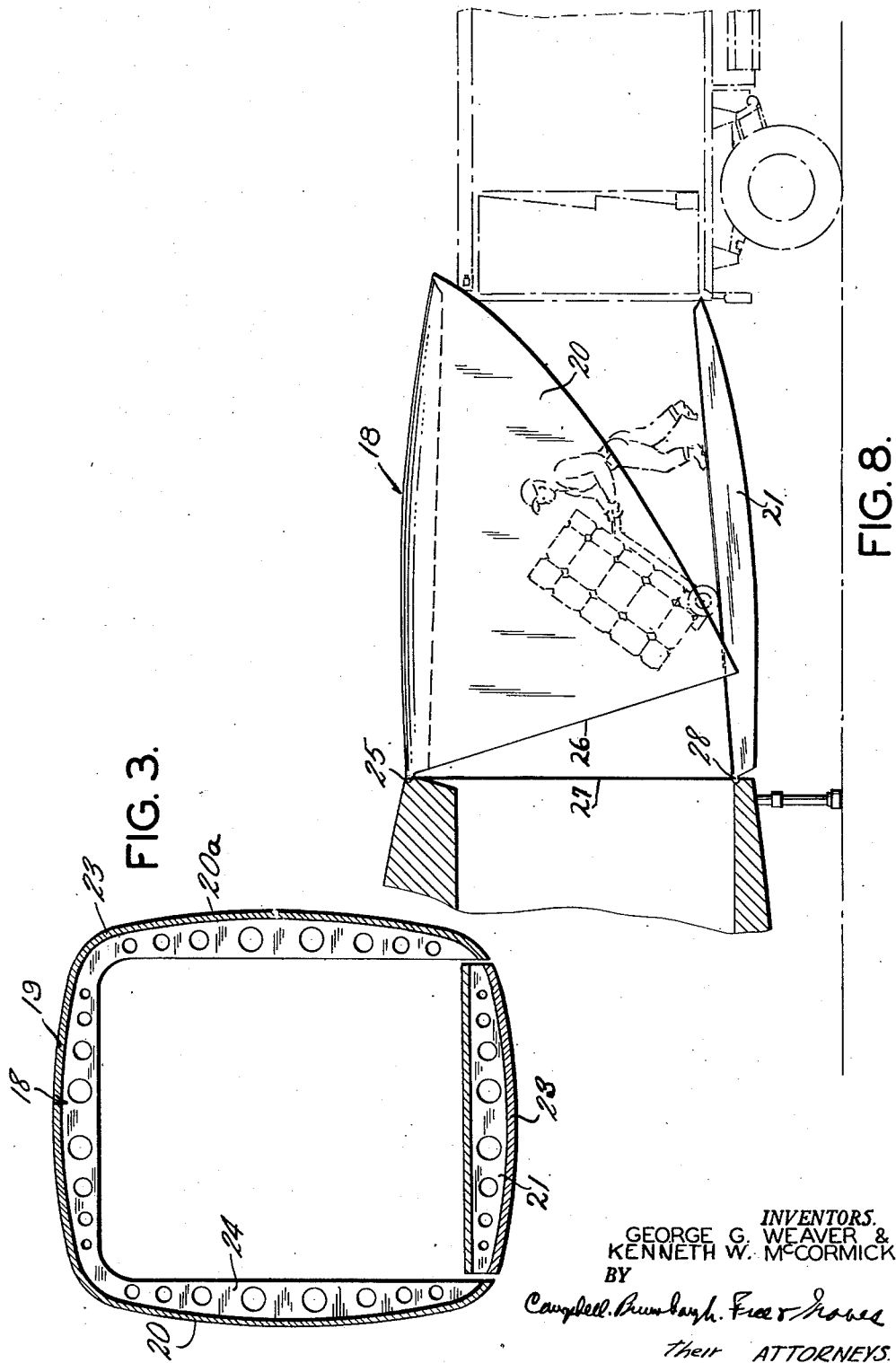

Aug. 21, 1956 G. C. WEAVER ET AL 2,759,691
AIRCRAFT CARGO LOADING DOORS
Filed Aug. 4, 1953 6 Sheets-Sheet 4
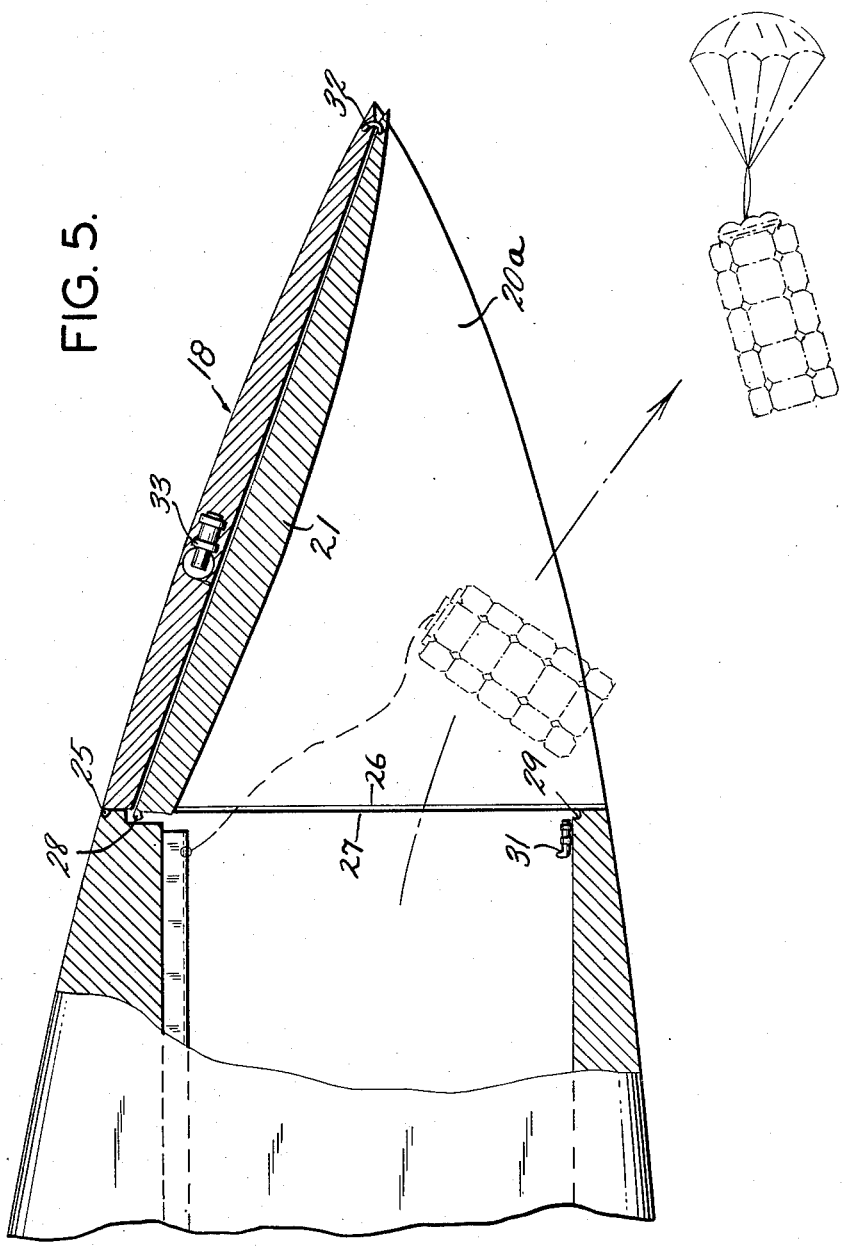
INVENTORS.
GEORGE G. WEAVER &
KENNETH W. McCORMICK
BY
*Their* ATTORNEYS.

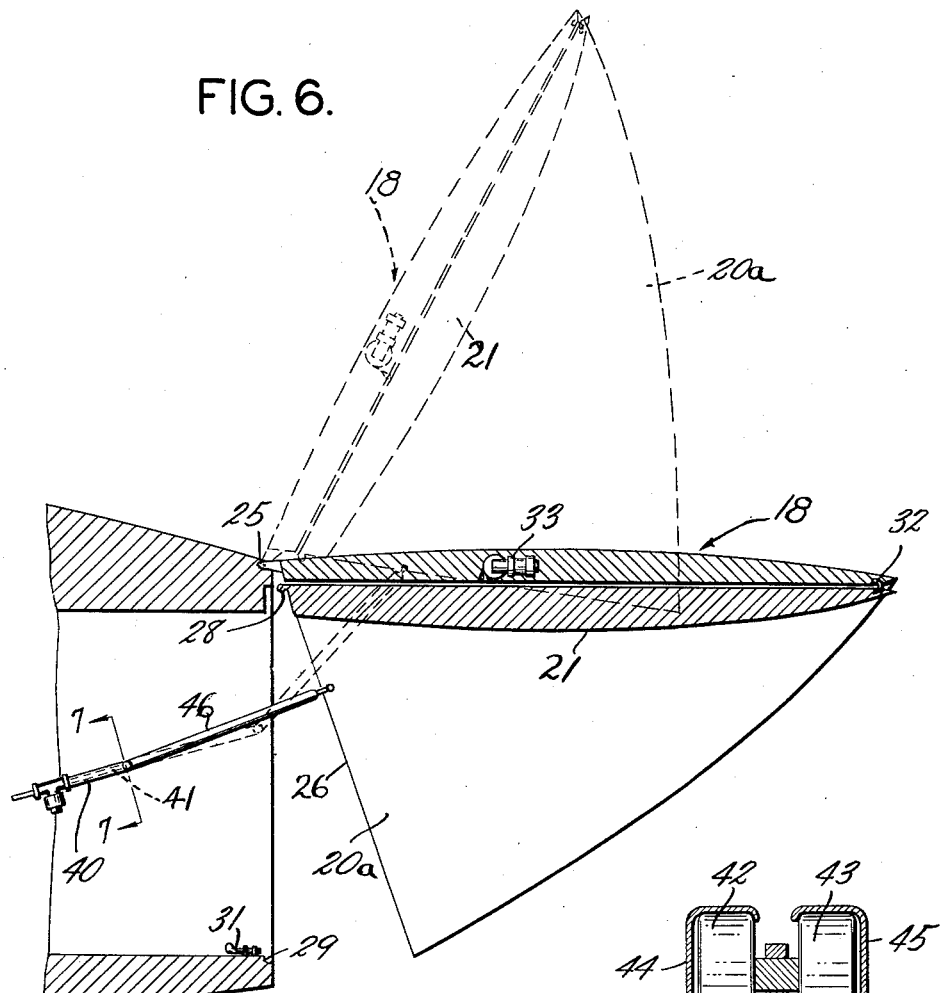

Aug. 21, 1956  G. C. WEAVER ET AL  2,759,691
AIRCRAFT CARGO LOADING DOORS
Filed Aug. 4, 1953  6 Sheets-Sheet 6

INVENTORS
GEORGE G. WEAVER
KENNETH W. McCORMICK
BY Campbell, Brumbaugh, Free & Graves.
their ATTORNEYS

United States Patent Office 2,759,691
Patented Aug. 21, 1956

2,759,691

AIRCRAFT CARGO LOADING DOORS

George C. Weaver, Hagerstown, Md., and Kenneth W. McCormick, Dayton, Ohio, assignors to Fairchild Engine and Airplane Corporation, a corporation of Maryland Application August 4, 1953, Serial No. 372,372

8 Claims. (Cl. 244—118)

This invention relates to improvements in cargo-carrying aircraft and it relates particularly to an improved form of door for cargo-carrying aircraft to facilitate loading and unloading of the aircraft and the aerial delivery of cargo or passengers.

A great many of the cargo-carrying aircraft are provided with loading doors in the side of the fuselage. It has long been recognized that such side opening doors are not entirely satisfactory because of the need for making a right angle turn with the cargo to load it through or discharge it from the door. Large articles, such as vehicles, artillery and the like, cannot readily be discharged aerially for parachute drops through such side opening doors because of the difficulty of forcing them out of the door and the danger of being entangled in parts of the aircraft. For that reason, aircraft, such as the Fairchild C–82 series aircraft shown in U. S. Design Patent No. 140,220, have been provided with rear opening doors which allow the entire rear end of the fuselage to be opened for loading and unloading. The doors provided heretofore for closing the loading opening are of the so-called "clam shell" type in which the doors are hinged to the sides of the fuselage so that they can be swung outwardly and in which the edges of the doors meet in a vertical plane. The "clam shell" doors greatly facilitate the ground loading and unloading of the aircraft because it is possible to back a truck or the like directly up to the opening in the fuselage and load the cargo or unload it directly through the opening. However, the "clam shell" doors have one disadvantage. When the aircraft is used for the aerial dropping of artillery or other large articles, the doors must be swung outwardly to almost their full extent. As a result, the air drag imposed by the doors is enormous and it has been found necessary because of this enormous air drag to remove the doors from the aircraft when it is intended to drop heavy or large articles of the type referred to above by parachute.

The present invention provides a novel type of door for closing the rear loading opening of an aircraft which enables the door to be opened when the aircraft is in flight to discharge large or small articles without imposing a severe drag on the plane and without impeding the discharge of large articles, such as artillery, vehicles, gasoline and food canisters and many other large pieces of equipment. More particularly, the invention comprises a multi-section door, the sections being hinged to the top and bottom edges of the fuselage and forming a wedge-shaped or "beaver-tail" extension on the end of the fuselage. The upper and lower door sections are mounted hingedly on the top and bottom portions of the fuselage so that the outer end of a lower section can be lowered to form a loading ramp or raised to close the open side or bottom of the upper section of the door. The upper section of the door is a hood-like structure conforming to the contours of the fuselage and it also can be raised and lowered for loading and discharging cargo or provisions. When the upper and lower sections are brought together, to close the rear of the fuselage, the wedge-shaped or "beaver-tail" contour referred to above is formed, thereby giving the fuselage a streamlined or airfoil contour of good aerodynamic characteristics.

A particular feature of the door is that it may include a lower door section which is detachably and hingedly connected to the bottom of the fuselage and the outer end of the top section, and means is provided in the device for moving the bottom section around either of the hinged connections. In this way the bottom section can serve as a ramp or it can be moved up into the top section of the door to provide an obstructed opening through which the cargo can be air dropped without moving the top section to such an extent that it would seriously effect the aerodynamic characteristics of the fuselage.

For a better understanding of the present invention, reference may be had to the accompanying drawings in which:

Fig. 1 is a plan view of a portion of a cargo airplane having a door thereon embodying the present invention;

Fig. 2 is a view in side elevation of a portion of the airplane having the door disclosed in Fig. 1;

Fig. 3 is a view in section taken on line 3—3 of Fig. 1 showing the two-piece construction of the door;

Fig. 4 is a view in section taken on line 4—4 of Fig. 1 showing the lower section of the door lowered into position for use as a loading and unloading ramp;

Fig. 5 is a view in longitudinal section through the door illustrating the lower door section raised into position to permit paratrooper or light cargo drop;

Fig. 6 is a view in section similar to Fig. 4 showing the door fully open for heavy cargo flight drop and in dotted line position for ground loading;

Fig. 7 is a view in section taken on line 7—7 of Fig. 6;

Fig. 8 is a view in side elevation and partly in section of a door illustrating another use of the door as a loading ramp.

Figure 9:
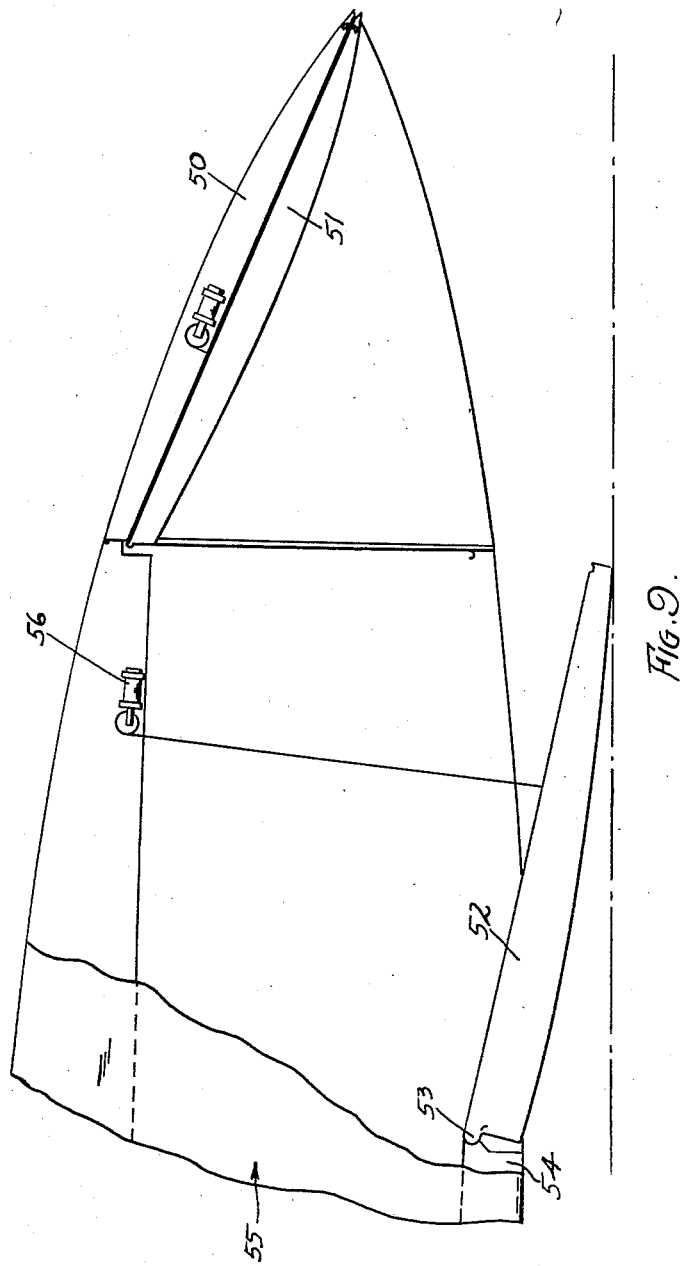
Fig. 9 is a view in longitudinal section of a modified form of door embodying the invention.

The present invention will be described hereinafter with reference to its use in conjunction with aircraft 10 of the Fairchild C-82 series having a wing 11, a centrally located cargo and passenger carrying fuselage 12 and twin booms 13 and 14 for supporting the empennage 15 of the aircraft. The fuselage 12 is provided with the usual pilot's compartment. The aircraft door 17 encompasses the rear end of the fuselage and the empennage 15 is set sufficiently high to enable trucks or the like to back under the empennage for access to the door.

As shown in Figs. 1 and 2, the door 17 which is cross-hatched in Figs. 1 and 2 to show its relation to the remainder of the fuselage 12, is generally of wedge-shape or airfoil contour in side view and includes an upper hood-like section 18 including the downwardly inclined top panel 19 and generally triangular opposite side panels 20 and 20a and a lower upwardly inclined section 21. The top and side panels of the door section 18 may consist for example, of a thin metal skin 23, supported by drilled or cutaway girders 24 for lightness and strength. The structure of the door may conform to requirements and the usual aircraft practice. The lower door section 21 may be reinforced to form a loading ramp.

As shown in Figs. 4 to 8, the upper section 18 of the door is connected to the top of the fuselage by means of a hinge 25 which extends transversely thereof and enables the top section 18 to be rocked between the lowered position shown in Fig. 4 and the fully raised position shown in dotted lines in Fig. 6. When the upper section 18 is in its lowered position, the vertical or inner edges 26 of the side panels 20 and 20a abut against the end edges 27 of the sides of the fuselage.

The lower section 21 of the door is connected to the bottom edge of the fuselage by means of a detachable hinge joint 28. The hinge joint 28 may consist of a groove or series of recesses 29 in the fuselage and a series of rounded fingers 30 on the door section 19 which engage in the recesses and may be retained therein by means of bolts 31 which overlie the fingers and prevent them from moving out of the grooves 29. Any other suitable releasable hinge may be used, if desired. The hinge joint 28 allows the door section 21 to be lowered into contact with the ground or against the tail gate of a truck, as shown in Figs. 4 and 8 to form a loading ramp by means of which heavy articles may be loaded into the aircraft.

The outer end of the bottom section of ramp 21 can be swung up into contact with the outer end of the top panel 19 of the top section to close the opening in the bottom of the section 18. It is retained therein by means of a releasable hinge 32 which also serves both as a hinge and a latch between the outer end of the ramp 21 and the outer end of the upper door section 18. This hinge 32 is used to swing the ramp 21 out of the way and provide an opening through which the aerial drop of supplies or paratroopers can be accomplished. As shown in Fig. 5, the upper section 18 of the door may be provided with electrically operated winches 33 at its opposite sides having cables 34 connected to the ramp 21 between its ends. When the outer end of the ramp 21 is secured by the hinge 32 and the inner end of the ramp is released by withdrawing the bolts 31, the entire ramp 21 can be swung up against the inside of the panel 19 of the hood-like upper section 18 by means of the winches 33. In this way, without altering the contour of the fuselage or swinging any part of the door out into the airstream to impart drag, a large discharge opening is provided in the undersurface of the fuselage.

When larger articles are to be discharged, the upper section 18 may also be rocked to position the top panel 19 in a substantially horizontal position, as shown in Fig. 6, thereby to completely open the tail of the fuselage. Movement of the upper section 18 to the full or dotted line positions shown in Fig. 6 may be accomplished by means of a mechanically or hydraulically actuated jack 40 fixed to the fuselage and having an axially movable rod or screw shaft 41 thereon which is guided by means of a pair of rollers 42 and 43 running in the supporting channel-like tracks 44 and 45 on the inside of the fuselage. The rod 41 is connected by means of a pivoted link 46 to a side panel 20 or 20a of the top section 18. Preferably, a jack 40 will be provided on each side of the fuselage for elevating and lowering the top section 18.

The hinging movements of the top section 18 and the ramp 21 make the device especially convenient for loading and unloading. Thus, when for one reason or another it is impossible to back a truck up against the rear end of the fuselage, the top or hood section 18 may be partly raised, as shown in Fig. 8, and the ramp section 21 used as a bridge between the end of the fuselage and the back of the truck. The top section can, of course, be swung completely out of the way and the ramp 21 swung up inside of it, as shown in dotted lines in Fig. 6, to permit a truck to back up against the rear end of the fuselage.

The door may be modified somewhat to enable the loading and unloading of even larger pieces of cargo. As shown in Fig. 9, the door may be formed of three sections instead of two. The door includes a top section 50 like the section 18 described above, a lower section 51 is detachably hinged to the outer end of the top section 50 and to the outer end of another door and ramp section 52. The door and ramp section 52 has its inner end connected by means of the permanent hinge 53 to the rear end of the floor 54 of the fuselage 55. The floor 54 and the ramp section 52 may be reinforced to support heavy cargo while the door section 51 may be lighter inasmuch as it will be used principally to load and discharge lighter cargo or paratroopers.

The door and ramp section 52 may be raised by means of winches 56, hydraulic jacks or other suitable devices which may be powerful enough to lift the door and ramp section 52 with heavy cargo on it to aid in loading it in the fuselage.

From the preceding description, it will be apparent that we have provided a door for aircraft which greatly facilitates the loading of the aircraft and enables aerial drops to be made without removing the door or without imposing a greatly increased drag on the airplane when the door is open. Moreover, the door provides increased flexibility in handling the cargo because it includes a conveniently arranged ramp which accommodates the aircraft to different sizes of trucks and the like which may be used for loading it.

It will be understood that the size and arrangement of the parts of the door are susceptible to considerable modification depending upon the aircraft in which they are used and, therefore, the form of the invention described herein should be considered as illustrative and not as limiting the scope of the following claims.

We claim:

1. An aircraft fuselage having a pilot's compartment, freight and passenger space and a wedge-shaped trailing end having converging top and bottom panels and approximately triangular side panels fixed to said top panel, first hinge means connecting the inner end of the top panel to the fuselage for rocking movement about an axis transversely of said fuselage, releasable hinge means substantially parallel with said first hinge means connecting the inner and outer ends of the bottom panel, respectively, to the bottom of the fuselage and the outer end of the top panel, and means to rock said top and bottom panels selectively around their respective hinge means.

2. In an airplane, a fuselage for receiving passengers, freight and the like, a loading door at the trailing end of said fuselage, said door comprising a top panel having a hinge connection at one end with the top of the fuselage and forming a continuation thereof, a bottom panel having a detachable hinge connection with the bottom of said fuselage and forming a continuation thereof, said top and bottom panels converging toward each other and having a releasable connection with each other at their outer ends, side panels fixed to the edges of said top panel and overlapping the edges of the bottom panel, and means to rock said top panel around its hinge connection with said fuselage and said bottom panel selectively about the hinge connection with the fuselage and the hinge connection with said top panel.

3. An airplane comprising a fuselage for receiving passengers, freight and the like, said fuselage having a loading opening in its trailing end, said opening having a door including a ramp member forming an extension of the bottom of the fuselage and having a releasable hinge connection therewith to enable said ramp to be lowered and raised, said door further including a hood member having a top and side panels and an open bottom, said hood member having a hinge connection with the top of the fuselage for up and down rocking movement, said ramp member fitting and closing the open bottom of the hood member, detachable hinge means connecting the outer end of the ramp member to the outer end of said hood member, and means for moving said hood member and said ramp member selectively around said hinge connection and hinge means.

4. The airplane set forth in claim 3, in which said side panels are substantially triangular in shape and have apices extending rearwardly of said fuselage.

5. The airplane set forth in claim 3, in which the top of the hood member and the ramp member converge rearwardly to form a wedge-shaped trailing end on said fuselage having the outer ends of the ramp and hood member disposed substantially transversely of the fuselage.

6. The airplane set forth in claim 3, in which the means for moving the hood member and the ramp member comprise a jack interposed between said fuselage and said hood member and hoisting means connecting said hood member and said ramp member.

7. An airplane comprising a fuselage having a space for receiving passengers, freight and the like, said fuselage having a loading opening at its trailing end and a door for said opening, said door comprising a hollow extension of said fuselage having a top and generally triangular side panels and an open bottom, said extension having a hinge connection with the top of said fuselage for up and down movement, a loading ramp having a hinge connection with the bottom of said fuselage and rockable up and down to cover and uncover the open bottom of said extension, means detachably and hingedly connecting the inner and outer ends of said ramp to the fuselage and the outer end of said extension for rocking movement relative thereto, and means to rock said ramp around its inner end or its outer end, selectively.

8. The airplane set forth in claim 7, comprising a ramp and door section hinged at one end to and forming a part of the bottom of said fuselage, said loading ramp having a detachable hinge connection with the outer end of said ramp and door section.

References Cited in the file of this patent

UNITED STATES PATENTS

| | | |
|---|---|---|
| 2,095,440 | Hojnowski | Oct. 12, 1937 |
| 2,315,117 | Freytag | Mar. 30, 1943 |
| 2,335,090 | Swiech | Nov. 23, 1943 |
| 2,378,856 | Laddon et al. | June 19, 1945 |
| 2,425,972 | Watter | Aug. 19, 1947 |
| 2,544,855 | Parker | Mar. 13, 1951 |
| 2,547,811 | Burnelli | Aug. 3, 1951 |